United States Patent
Moreillon

(10) Patent No.: US 9,538,222 B2
(45) Date of Patent: *Jan. 3, 2017

(54) DEVICE FOR THE ALLOCATION AND MANAGEMENT OF SUBSCRIPTIONS FOR THE RECEPTION OF BROADCAST PRODUCTS

(71) Applicant: NAGRAVISION S.A., Cheseaux-sur-Lausanne (CH)

(72) Inventor: Guy Moreillon, Bioley-Orjulaz (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 614 days.

This patent is subject to a terminal disclaimer.

(21) Appl. No.: 13/927,986

(22) Filed: Jun. 26, 2013

(65) Prior Publication Data

US 2013/0291005 A1 Oct. 31, 2013

Related U.S. Application Data

(63) Continuation of application No. 12/993,805, filed as application No. PCT/EP2009/056041 on May 19, 2009, now Pat. No. 8,484,673.

(Continued)

(51) Int. Cl.
*H04N 7/167* (2011.01)
*H04N 21/266* (2011.01)
(Continued)

(52) U.S. Cl.
CPC ............ *H04N 21/266* (2013.01); *H04N 7/162* (2013.01); *H04N 21/26606* (2013.01); *H04N 21/4623* (2013.01)

(58) Field of Classification Search
CPC .. H04N 7/1675; H04N 7/163; H04N 21/4181; H04N 21/26606; H04N 21/435
(Continued)

(56) References Cited

U.S. PATENT DOCUMENTS 6,393,562 B1 5/2002 Maillard
6,466,671 B1 10/2002 Maillard et al.
(Continued)

FOREIGN PATENT DOCUMENTS

EP 1 109 405 6/2001
EP 1 411 727 4/2004
(Continued)

OTHER PUBLICATIONS

International Search Report issued in International Application No. PCT/EP2009/056041, mailed Sep. 11, 2009.
(Continued)

*Primary Examiner* — Jason Salce
(74) *Attorney, Agent, or Firm* — DLA Piper LLP (US)

(57) ABSTRACT

A device to reduce bandwidth necessary for renewal of subscriptions for reception of broadcast services including: defining a plurality of sets of subscriber identification numbers, each set being associated with a product; splitting a set of subscriber identification numbers into groups of subscribers; searching for an available subscriber identification number related to the desired product at the time of initialization of a new subscriber; confirming that an inhibit duration has elapsed between the end of the previous subscription and the start of the new subscription; sending an initialization message to the new subscriber addressed with his unique identification address and containing the subscriber identification number of, and rights to, his product; preparing a group rights renewal message for the product to the group containing the subscriber identification number, this message comprising the group header containing this subscriber and a compressed bitmap for individually addressing each of the group members.

7 Claims, 1 Drawing Sheet

Related U.S. Application Data

(60) Provisional application No. 61/056,314, filed on May 27, 2008.

(51) Int. Cl.
  *H04N 7/16* (2011.01)
  *H04N 21/4623* (2011.01)

(58) Field of Classification Search
  USPC ........ 725/1–4, 8, 27–31, 116, 146; 713/150, 713/155, 171; 726/2–7, 9–10, 16–21, 26–30
  See application file for complete search history.

(56) References Cited

U.S. PATENT DOCUMENTS

| | | |
|---|---|---|
| 7,251,617 B1 | 7/2007 | Walker |
| 7,644,429 B2 | 1/2010 | Bayassi |
| 2002/0129249 A1 | 9/2002 | Maillard |
| 2004/0052377 A1 | 3/2004 | Mattox et al. |
| 2004/0068541 A1 | 4/2004 | Bayassi |
| 2004/0240394 A1 | 12/2004 | Cochard et al. |
| 2006/0064443 A1 | 3/2006 | Duval |
| 2006/0117392 A1 | 6/2006 | Courtin et al. |
| 2008/0059993 A1 | 3/2008 | Jia et al. |
| 2009/0153727 A1 | 6/2009 | Shimoda et al. |
| 2009/0222676 A1 | 9/2009 | Becq et al. |
| 2011/0099364 A1 | 4/2011 | Robyr |
| 2011/0099567 A1 | 4/2011 | Moreillon |

FOREIGN PATENT DOCUMENTS

| | | |
|---|---|---|
| EP | 1 638 331 | 3/2006 |
| EP | 1 662 789 | 5/2006 |
| EP | 1 775 950 | 4/2007 |
| EP | 1 853 000 | 11/2007 |
| FR | 2 894 745 | 6/2007 |
| JP | 2007-129575 | 5/2007 |
| WO | WO 02/062054 | 8/2002 |
| WO | WO 2005/020564 | 3/2005 |
| WO | WO 2009/141328 | 11/2009 |

OTHER PUBLICATIONS

Written Opinion issued in International Application No. PCT/EP2009/056041, mailed Sep. 11, 2009.
English language abstract of EP 1 662 789 published May 31, 2006.
English language abstract of EP 1 638 331 published Mar. 22, 2006.
English language abstract of EP 1 775 950 published Apr. 18, 2007.
English language abstract of FR 2 894 745 published Jun. 15, 2007.
Image File History of U.S. Appl. No. 12/993,805.
Image File History of U.S. Appl. No. 13/985,029.
International Search Report issued in International Application No. PCT/WP2012/051513, dated Mar. 19, 2012.
Written Opinion issued in International Application No. PCT/WP2012/051513, dated Mar. 19, 2012.
English translation and abstract of JP 2007-129575, published May 24, 2007.

DEVICE FOR THE ALLOCATION AND MANAGEMENT OF SUBSCRIPTIONS FOR THE RECEPTION OF BROADCAST PRODUCTS

CROSS-REFERENCE TO RELATED APPLICATIONS

This application is a continuation of U.S. patent application Ser. No. 12/993,805, filed Nov. 19, 2010, which is a National Stage of PCT/EP2009/056041, filed May 19, 2009, which, in turn, claims the benefit of U.S. Provisional Patent Application No. 61/056,314, filed May 27, 2008. All of the foregoing applications are incorporated by reference in their entireties for all purposes.

INTRODUCTION

This invention concerns the management of a set of subscribers to broadcast services subject to conditional access.

PRIOR ART

Visual or audio services are transmitted in the form of a data flow to receivers, such as home receivers (set-top-box) or mobile receivers. By way of example a data flow could be a stock-exchange data service, a weather forecast, general-purpose television, a sports event broadcast and so on. These contents can be broadcast on user units such as a Pay-TV decoder, a computer or even a mobile phone, a "palm-top", a PDA, a radio, a television, a multimedia terminal.

The digital data flow is encrypted in order to be able to restrict the use and define the conditions for such use. This encryption is accomplished thanks to control words which are changed at regular interval (between 5 and 30 seconds) in order to dissuade any attack aimed at discovering such control words.

In order to allow the user unit to decipher the data flow encrypted by a control word, the latter is sent independently of the data flow in a control message (ECM) encrypted by a key used in the system allowing for the transmission between the management center (CAS) and the security module of the user unit. Indeed, the security operations are carried out in a security module (SC) which is a tamper-proof device. This module process the messages related to the rights of the receiver.

At the time of the decryption of the control message (ECM), the right of access to the considered data flow is verified in the security module (SC). The control word is returned in clear to the to user unit only when the verification is positive.

As is well known to a person skilled in the art, the security module can essentially be realized according to any of four distinct forms. One such form is a microprocessor card, a smart card, or more generally an electronic module (having a form of key, or a badge etc). Such a module is connectable and generally removable from the decoder. The form with electric contact is the most used, but the version without contact for instance of type ISO 14443 is also used. It can also take the form of an SD card, microSD, MMC, Memory stick or any other form of memory card.

In a second known form, the security module is integrated in an electronic circuit package, mounted generally in a permanent and non-removable way in the decoder box. An alternative is made of a circuit package mounted on a connector such a SIM module connector.

In a third form, the security module is integrated in an integrated circuit package having also another function, for instance in the decoder's descrambling module or the decoder's microprocessor.

In a fourth embodiment, the security module is not physically realized, but its function is implemented in the form of software. Given that in the four cases, although the security level differs, the function is identical, we can refer to security module whatever way its function is realized or the form that this module takes.

The reception rights are generally managed by authorization messages (EMM) which are loaded into the security module (SC). Other possibilities are also possible such as sending decryption keys.

It is well known that such security modules include a unique identification number UA0 loaded into the memory during an initialization phase. At the time of the subscription to a television service, the security module (SC) receives a subscriber identification number UA1 which will be used later in a group addressing method.

According to an example in which the size of the group of subscribers is 512, the 9 lower bits of the subscriber identification number UA1 will be ignored and the receiver will filter the address of UA1 based on the bits of higher significance than that of the $9^{th}$ bit.

It is the subscriber identification number UA1 which will serve to address the security module in a group basis, the unique number UA0 taking part if individual addressing is necessary. This is the case at the time of a subscription modification, for instance the recording in the security module of a subscription right for a new product.

Thus, the receiver will configure its message filter in order to pass the messages containing in the header the unique identification number UA0 or the subscriber identification number UA1. These numbers are transmitted by the security module to the receiver in order to initialize its filter.

The subscription management is managed according to the principle of rights renewal i.e. that rights are linked with an expiry date after which the security module refuses to consider his rights as valid. In order for the subscriber to be able to continue to take advantage of his subscription without interruption it is thus necessary to transmit a rights renewal message (in so for as the subscriber has the right to receive it) postponing the expiry date till later.

In practice, the duration of a renewal is typically 1 month, which means that all the receivers must receive a renewal message within a month. Since we are in a broadcast environment, the management center does not know when the receivers are switched on and this is the reason why the messages are repeated many times.

To reduce the number of message to be sent, it has been proposed to use group addressing rather than individual addressing. Take the example of a provider proposing 5 products for subscription. It will then be necessary to send 5 rights renewal messages per group, each message comprising the renewal conditions for a product. Since not all the group members will have subscribed to the product related to this message, a group message thus comprises a field of type bitmap with one bit dedicated to each member of the groups. If a group contains 256 members, the bitmap field will contain 256 bits, each bit being attributed to a specific security module.

The security module, at the time of reception of the group message, will first verify if its own bit is at 1 to know if the renewal command is intended for it. If the bit is at 0, it will ignore the renewal control, or even clear the subscription right considered by this message.

It is apparent that such a message is encrypted and that only the security modules have access to the key to decrypt it. Moreover, the message contains authentication data ensuring that only the designated authority can generate such message. This is done thanks to asymmetrical key cryptography.

One of the problems encountered is of course the large number of renewal messages to be sent and therefore the use of available bandwidth, the latter being best used for audio-visual services. In our example with 5 products, each subscriber having subscribed to one product, the bitmap will be on average filled to 20% with 1's and to 80% with 0's, given that the products are uniformly distributed among the subscribers. This is the ideal situation and is rather unlikely. The bitmap will in fact have a unpredictable structure, some groups having a large number of participants having subscribed for a specific product and other groups having a small number of participants having subscribed to this same product. This entropy makes the compression of the bitmap very difficult.

One can imagine the necessary bandwidth when more that 2 million subscribers should be managed. An approach therefore consists in increasing the size of the groups (1024 or more) to reduce the number of messages but it will then be necessary to increase the size of the messages to be able to contain a bitmap of 1024 or even more, thus having the effect of increasing the bandwidth used by these messages and reducing the gain achieved by the group messaging technique. It can be seen that the increase of the group size can only be a partial solution.

Another problem which has been observed is the volatility rate of the client-base which subscribe and then unsubscribe some months later. The subscription number initially allocated to such a subscriber can no longer be used. Indeed, the rights are still present in the first receiver (or security module) at the moment of the end of the subscription. To bypass the access control system, the owner needs simply to interrupt the reception of the messages containing a zero in the bitmap signalling an erase command. If this subscription number is furthermore reallocated to a second receiver some months later, the first receiver needs simply to be switched on in order for the renewal messages to be received and for the rights to be unjustly updated, allowing for the undue reception of audiovisual services.

To avoid this, the number allocated to a subscriber is no longer used after its expiry. The arrival of new subscribers leads to the creation of new groups while older groups shrink and contain only a few subscribers for which it is nevertheless necessary to send a group message.

The document U.S. Pat. No. 6,466,671 is an illustration of the method leading to the huge number of renewal messages.

BRIEF DESCRIPTION OF THE INVENTION

The aim of the present invention is to propose a method to reduce the bandwidth necessary for the renewal of subscriptions to the reception of broadcast services.

This aim is achieved by a method for the allocation and management of subscriptions to a plurality of products for at least one receiver comprising a security module, this module comprising a unique identification address UA0, this method being carried out by a management center and comprising the following steps:
defining a plurality of sets of subscriber identification numbers AB, each set being associated with a product,
splitting a set of subscriber identification numbers into groups of subscribers,
searching for an available subscriber identification number ABk related to the desired product at the time of the initialization of a new subscriber,
determining if this available number has already been previously allocated,
if so, determining if an inhibit duration has elapsed between the end of the previous subscription and the start of the new subscription, if not, searching for a new number,
sending an initialisation message to the new subscriber addressed according to his unique identification address UA0 and containing the subscriber identification number ABk of his product as well as the right to said product,
preparing a group rights renewal message for the product to the group containing the subscriber identification number ABk, this message comprising the group header containing this subscriber ABk and a bitmap allowing to individually address each of the group members,
compressing the bitmap and adding the compressed bitmap to the message,
sending the renewal message.

By product, we mean a subscription to a television channel, a plurality of channels or a television event series (e.g. football season, serials, episodes).

Thus the management center does not manage a range of subscriber numbers common to all products but a specific range per product. Consequently, the groups constituting subscribers of a product will, in principle, be full. Advantageously, group messages will affect a large majority of members of a group. Another advantage is that the bitmap will be compressible since it is formed, for the most part, by active bits (bits set to one).

The reasons leading to a group not being full are the following:
creation of a new group at the time of the arrival of new clients
cancellation by a member of the group, this number still being within the inhibit duration.

BRIEF DESCRIPTION OF THE DRAWINGS

The invention will be better understood thanks to the following detailed description and with reference to the attached drawings which are given as a non-limiting example, namely.

DETAILED DESCRIPTION

Figure 1:
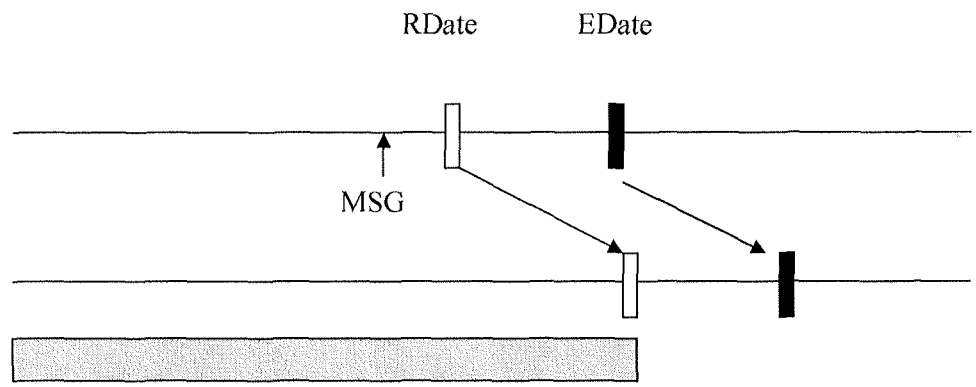
FIG. 1 shows the case of a renewal before the expiry date.

The invention is divided into two parts cooperating together.

The first part of the invention is carried out in the management center and is based on the method for the allocation of a subscriber number at the time of the conclusion of a contract. This method is also carried out at the modification of a product for a subscriber or the conclusion of a subsequent subscription.

At the time of the initial definition of the range numbers by product, a range is divided into groups (for example 2048 members) each number is indexed in a database with management data. One of these data concerns the above mentioned inhibit predetermined duration.

This duration is used by the security module, member of a group, according to the following method:
receiving at least one group rights renewal message for at least one product by the security module, said security module being a member of said group, this message containing an expiry date for the rights to said product and a current date,
verifying that the group rights renewal message authorizes the renewal of the rights for said security module,
verifying that the current date is before an inhibit date, if so:
replacing the expiry date of said rights with the received expiry date,
generating a new inhibit date by adding an inhibit duration to the current inhibit date, in such a way that the new inhibit date is after the new expiry date.

This module comprises a unique address UA0 and at least a subscriber address ABx which is allocated when someone takes out a subscription for the product X. The module will therefore receive as many subscriber addresses as the subscriber subscribes to products.

It is this addressing method which will be used to send personalized messages (single message addressed to UA0) or group messages (shared messages addressed to ABn). A group message includes in its header a product identifier which is compared, by the receiver, with the identification of products to which the subscriber of this security module has subscribed. The subscriber's security module will also be a member of this group for that product in order to receive this kind of message. Since this message is addressed to a group (usually of 256, 512, 1024 or even 2048 participants), this message also includes data pertaining to each security module which has the form of a bitmap. 512 bits are placed in the message (for the example to 512 participants) and each security module knows which of the bits is the one that concerns it. The message contains the starting address of the bitmap and the 512 bits of the bitmap allow to address specifically the 512 participants following the starting address. Thus the command contained in the message is addressed to a subset (or all) of the group designated by the bitmap. According to this, in case that a right should be renewed, one put the bit in the bitmap is set to 1 for all the members of the group for which the renewal is authorized and to zero for the others.

At the time of the reception of a renewal message, once the message for its group received, the security module will verify in the bitmap if the command in the message is addressed to it. Once this verification is made, the inhibit date is verified in order to determine if this command is still valid for the security module.

It is to be noted that the renewal message includes a current date which will be used for comparisons.

FIG. 1 shows the case where the current date of the message falls before the end of the expiry date RDate for the right. The current date of the renewal message being before the expiry date, the right is prolonged as well as the inhibit date EDate as illustrated on the second line. The authorization period of the service (or product) related to this right is illustrated in grey indicating that no interruption has taken place.

Figure 2:
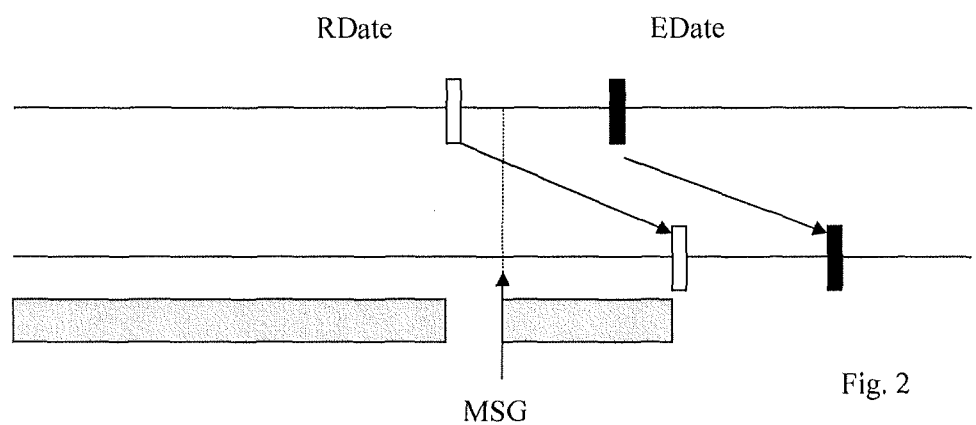
FIG. 2 shows the case of a renewal after the expiry date.

FIG. 2 shows the case where the current date of the renewal message falls after the expiry date RDate but before the inhibit date EDate. It can be seen on the grey part that from the first expiry date till the arrival of the renewal message MSG, the authorization to the service is interrupted. Once the message is processed, the authorization is enabled till the new expiry date RDate.

Figure 3:
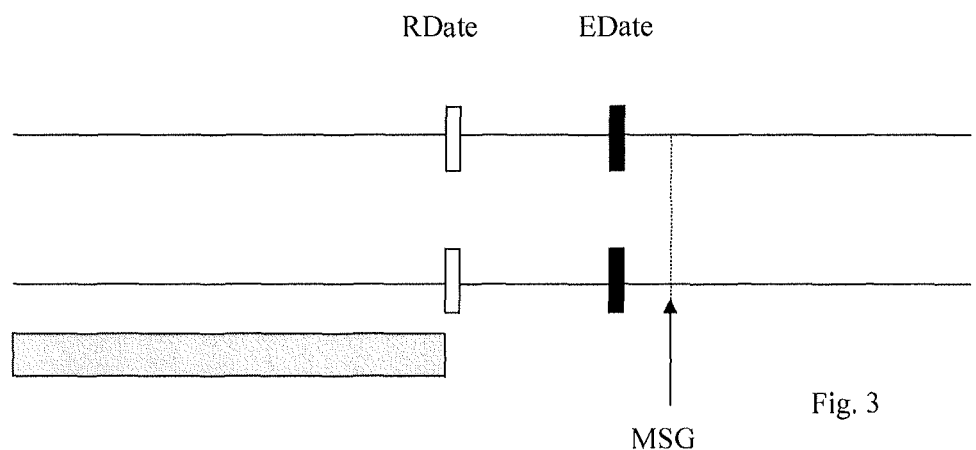
FIG. 3 shows the case of a renewal message arriving after the inhibit date.

In FIG. 3 we see the case where the current date of the renewal message is situated after the inhibit date EDate. In this case the renewal is ignored and the last expiry date defines the end of the authorization to the service.

According to an embodiment, a renewal message in which the bit related to this security module of the bitmap is set to zero causing the update of the expiry date RDate to the current date of the message and this causes the ending of the authorization related to the right. Indeed, the subsequent control messages, containing the control words and the description of the rights necessary for releasing this control word will comprise a date which will be after the expiry date RDate.

According to an embodiment, the security module includes a single date which is the expiry date RDate. Moreover, it includes an inhibit duration defined in day(s) or month(s) for instance which allows the security module to calculate the inhibit date when a renewal message is received. The inhibit date is thus calculated as the sum of the expiry date RDate and the inhibit duration.

It is thus not necessary to update two dates during a renewal operation. The inhibit duration can be defined at the time of the initialization of the security module, for instance with the initial loading of the rights.

According to another embodiment of the invention, the update of a new inhibit date by adding a predefined duration to the current inhibit date is done at the management center and the new inhibit date is contained in the renewal message. The new inhibit date is extracted for the message and stored in the security module.

Thanks to the method described above working in a security module, it is now possible to reuse an identification number of a given subscriber. Take the example of a subscriber terminating his subscription the on the $30^{th}$ of June. The expiry date RDate is thus fixed at $30^{th}$ June by the renewal of the previous date, for instance the $30^{th}$ of May. The group messages destined for the group to which the security module belongs, sent during the month of June, will contain a zero in the bit of the bitmap relating to this security module. No renewal will then be carried out during the month of June. The inhibit date is it fixed at the $30^{th}$ of July with a difference of one month relative to the expiry date (1 month=inhibit duration).

The management system can thus attribute the subscriber identification number ABk to another subscriber, knowing that after the $30^{th}$ of July, even if a renewal message were to be accepted by this security module (bitmap to 1), the renewal will not be carried out.

Thus, thanks to this mechanism, the members of the group are by and large active subscribers, the unique condition being to reserve the identification number of a subscriber having terminated his subscription during the time that the inhibit date is past. At the time of the allocation of a new subscriber identification number related to a given product, preference will be given to a group not having reached the threshold, allows for the efficient compression of the bitmap.

In order for the bitmap to be efficiently compressed, it should be homogeneous. Thus large numbers of consecutive 0's in the bitmap contribute to the homogeneity. In the same way, a group which is linearly filled, each subscriber following the previous one (as far as the subscriber identification number is concerned), allows for an optimal compression since a consecutive part of the bitmap is filled with 1's and the other part is filled with 0's (00000000 . . . 0000011111 . . . 1111111) Thereby the bitmap of this group can be efficiently compressed onto a few bytes in spite of the large size of the group, more than 2048 bits (more than 256 bytes).

The invention claimed is:

1. A management center device for allocation and management of subscriptions to a plurality of Pay-TV channels for at least one receiver comprising a security module, the security module comprising a unique identification address, the management center comprising:

a processor; and
a memory connected to the processor;
wherein the processor is adapted to:
group the plurality of Pay-TV channels into a plurality of groups of channels, each group of channels comprising at least one channel and being associated with a unique subscription;
define a set of subscriber identification numbers, each set of subscriber identification numbers being associated with one group of channels;
group the set of subscriber identification numbers into groups of subscribers;
select a new subscriber identification number related to a desired one of the plurality of groups of channels at the time of an initialization of a new subscription, the new subscriber information number being a subscriber identification number for which an inhibit duration has elapsed between the end of a previous subscription for which the subscriber identification number was previously allocated and the time of the initialization of the new subscription;
send an initialization message to a new subscriber associated with the new subscription, the initialization message being addressed according to the unique identification address and containing the subscriber identification number of the desired one of the plurality of groups of channels and a subscription right to the desired one of the plurality of groups of channels;
prepare a group rights renewal message for the group of channels for the group of subscribers associated with the subscriber identification number, the message comprising a group header containing a bitmap comprising an individual address for each member of the group of subscribers, the message further comprising an expiry date for the rights to the group of channels and a current date;
calculate a new inhibit date by adding a predetermined duration to a current inhibit date;
insert the new inhibit date in the group rights renewal message;
compress the bitmap and adding the compressed bitmap to the group rights renewal message; and
transmit, over a broadcast environment from the management center, the group rights renewal message to the receiver with the security module, the security module being associated with a member of the group of subscribers, a bit of the bit map being associated with the individual address of the security module;
wherein the group rights renewal message authorizes the renewal of the rights for the security module by replacing an existing expiry date of the rights with the received expiry date.

2. A management center device for allocation and management of subscriptions to a plurality of Pay-TV channels for at least one receiver comprising a security module, the security module comprising a unique identification address, the management center comprising:

a processor; and
a memory connected to the processor;
wherein the processor is adapted to:
group the plurality of Pay-TV channels into a plurality of groups of channels, each group of channels comprising at least one channel and being associated with a unique subscription;
define a set of subscriber identification numbers, each set of subscriber identification numbers being associated with one group of channels;
group the set of subscriber identification numbers into groups of subscribers;
select a new subscriber identification number related to a desired one of the plurality of groups of channels at the time of an initialization of a new subscription, the new subscriber information number being a subscriber identification number for which an inhibit duration has elapsed between the end of a previous subscription for which the subscriber identification number was previously allocated and the time of the initialization of the new subscription;
determine an inhibit duration and insert the inhibit duration in an initialization message, thereby allowing the security module, at the time of the replacing of the existing expiry date, to calculate a new inhibit date by summing the new expiry date and the inhibit duration and store the new inhibit date in the security module;
send the initialization message to a new subscriber associated with the new subscription, the initialization message being addressed according to the unique identification address and containing the subscriber identification number of the desired one of the plurality of groups of channels and a subscription right to the desired one of the plurality of groups of channels;
prepare a group rights renewal message for the group of channels for the group of subscribers associated with the subscriber identification number, the message comprising a group header containing a bitmap comprising an individual address for each member of the group of subscribers, the message further comprising an expiry date for the rights to the group of channels and a current date;
compress the bitmap and adding the compressed bitmap to the group rights renewal message; and
transmit, over a broadcast environment from the management center, the group rights renewal message to the receiver with the security module, the security module being associated with a member of the group of subscribers, a bit of the bit map being associated with the individual address of the security module;
wherein the group rights renewal message authorizes the renewal of the rights for the security module by replacing an existing expiry date of the rights with the received expiry date.

3. A method for allocation and management of subscriptions to a plurality of Pay-TV channels for at least one receiver comprising a security module, the security module comprising a unique identification address, the method comprising:

grouping, with a management center comprising a processor and a memory connected to the processor, the plurality of Pay-TV channels into a plurality of groups of channels, each group of channels comprising at least one channel and being associated with a unique subscription;

defining, with the management center, a set of subscriber identification numbers, each set of subscriber identification numbers being associated with one group of channels;

grouping, with the management center, the set of subscriber identification numbers into groups of subscribers;

selecting, with the management center, a new subscriber identification number related to a desired one of the plurality of groups of channels at the time of an initialization of a new subscription, the new subscriber information number being a subscriber identification number for which an inhibit duration has elapsed between the end of a previous subscription for which the subscriber identification number was previously allocated and the time of the initialization of the new subscription;

sending, with the management center, an initialization message to a new subscriber associated with the new subscription, the initialization message being addressed according to the unique identification address and containing the subscriber identification number of the desired one of the plurality of groups of channels and a subscription right to the desired one of the plurality of groups of channels;

preparing, with the management center, a group rights renewal message for the group of channels for the group of subscribers associated with the subscriber identification number, the message comprising a group header containing a bitmap comprising an individual address for each member of the group of subscribers, the message further comprising an expiry date for the rights to the group of channels and a current date;

calculating, with the management center, a new inhibit date by adding a predetermined duration to a current inhibit date;

inserting, with the management center, the new inhibit date in the group rights renewal message;

compressing, with the management center, the bitmap and adding the compressed bitmap to the group rights renewal message; and transmitting, over a broadcast environment from the management center, the group rights renewal message to the receiver with the security module, the security module being associated with a member of the group of subscribers, a bit of the bit map being associated with the individual address of the security module;

wherein the group rights renewal message authorizes the renewal of the rights for the security module by replacing an existing expiry date of the rights with the received expiry date.

4. A method for allocation and management of subscriptions to a plurality of Pay-TV channels for at least one receiver comprising a security module, the security module comprising a unique identification address, the method comprising:

grouping, with a management center comprising a processor and a memory connected to the processor, the plurality of Pay-TV channels into a plurality of groups of channels, each group of channels comprising at least one channel and being associated with a unique subscription;

defining, with the management center, a set of subscriber identification numbers, each set of subscriber identification numbers being associated with one group of channels;

grouping, with the management center, the set of subscriber identification numbers into groups of subscribers;

selecting, with the management center, a new subscriber identification number related to a desired one of the plurality of groups of channels at the time of an initialization of a new subscription, the new subscriber information number being a subscriber identification number for which an inhibit duration has elapsed between the end of a previous subscription for which the subscriber identification number was previously allocated and the time of the initialization of the new subscription;

determining, with the management center, an inhibit duration and insert the inhibit duration in an initialization message, thereby allowing the security module, at the time of the replacing of the existing expiry date, to calculate a new inhibit date by summing the new expiry date and the inhibit duration and store the new inhibit date in the security module;

sending, with the management center, the initialization message to a new subscriber associated with the new subscription, the initialization message being addressed according to the unique identification address and containing the subscriber identification number of the desired one of the plurality of groups of channels and a subscription right to the desired one of the plurality of groups of channels;

preparing, with the management center, a group rights renewal message for the group of channels for the group of subscribers associated with the subscriber identification number, the message comprising a group header containing a bitmap comprising an individual address for each member of the group of subscribers, the message further comprising an expiry date for the rights to the group of channels and a current date;

compressing, with the management center, the bitmap and adding the compressed bitmap to the group rights renewal message; and transmitting, over a broadcast environment from the management center, the group rights renewal message to the receiver with the security module, the security module being associated with a member of the group of subscribers, a bit of the bit map being associated with the individual address of the security module;

wherein the group rights renewal message authorizes the renewal of the rights for the security module by replacing an existing expiry date of the rights with the received expiry date.

5. A security module configured to provide permission for receiving a plurality of Pay-TV channels to a receiver; wherein the plurality of Pay-TV channels are grouped into a plurality of groups of channels, each group of channels comprising at least one channel and being associated with a unique subscription; and wherein a set of subscriber identification numbers is grouped into groups of subscribers, each set of subscriber identification numbers being associated with one group of channels; the security module comprising:

a memory storing a unique identification address, an inhibit date, and an expiry date; and a processor connected to the memory;

wherein the processor is adapted to:

receive an initialization message to a new subscriber associated with the new subscription, the initialization message being addressed according to the unique identification address and containing the subscriber identification number of the desired one of the plurality of groups of channels and a subscription right to the desired one of the plurality of groups of channels;

receive a group rights renewal message for the group of channels for the group of subscribers associated with the subscriber identification number, the message being transmitted over a broadcast environment from a management center, the message comprising a group header containing a bitmap comprising an individual address for each member of the group of subscribers, the message further comprising an expiry date for the rights to the group of channels and a current date;

compare the current date to the existing inhibit date;

in response to determining that the current date is after the existing inhibit date, maintain the existing inhibit date and the existing expiry date in the memory; and in response to determining that the current date is before the existing inhibit date and the bitmap indicating that the subscription right is valid, calculate a new inhibit date by summing the new expiry date and an inhibit duration, replace the existing inhibit date with the new inhibit date and renew the rights by replacing the existing expiry date of the rights with the received expiry date in the memory.

6. The security module of claim 5, wherein the group rights renewal message includes the new inhibit date.

7. The security module of claim 5, wherein the initialization message includes the inhibit duration.

\* \* \* \* \*